(12) United States Patent
Arazaki

(10) Patent No.: US 8,755,626 B2
(45) Date of Patent: Jun. 17, 2014

(54) IMAGE PROCESSING DEVICE, IMAGE PROCESSING METHOD, AND IMAGE PROCESSING PROGRAM

(75) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 13/336,108

(22) Filed: Dec. 23, 2011

(65) Prior Publication Data
US 2012/0163731 A1    Jun. 28, 2012

(30) Foreign Application Priority Data
Dec. 24, 2010 (JP) ................................. 2010-287191

(51) Int. Cl.
*G06K 9/38* (2006.01)
*G06F 15/00* (2006.01)
*H04N 1/40* (2006.01)

(52) U.S. Cl.
USPC .............................. 382/273; 358/1.9; 358/466

(58) Field of Classification Search
USPC .......... 382/252, 274, 276; 348/771, 770, 601, 348/615, 617; 358/3.03, 3.04, 3.05; 345/84, 345/85, 138, 148, 149
See application file for complete search history.

(56) References Cited

U.S. PATENT DOCUMENTS

| | | | | |
|---|---|---|---|---|
| 5,034,990 A * | 7/1991 | Klees | .............................. | 382/252 |
| 5,045,952 A * | 9/1991 | Eschbach | ...................... | 358/447 |
| 5,268,774 A * | 12/1993 | Eschbach | ...................... | 358/466 |
| 5,301,039 A * | 4/1994 | Tanioka | ........................ | 358/3.01 |
| 5,726,718 A * | 3/1998 | Doherty et al. | ................ | 348/771 |
| 6,115,504 A * | 9/2000 | Kumashiro | .................... | 382/273 |
| 2008/0239338 A1* | 10/2008 | Bailey et al. | ................... | 358/1.9 |
| 2010/0033509 A1* | 2/2010 | Sawa | ............................. | 345/690 |
| 2011/0164829 A1* | 7/2011 | Moribe | .......................... | 382/275 |

FOREIGN PATENT DOCUMENTS

JP    2000-125122 A    4/2000

OTHER PUBLICATIONS

Wong et al, Error diffusion with delayed decision, Proc. SPIE 2411, Human Vision, Visual Processing, and Digital Display VI, 198 (Apr. 20, 1995).*

* cited by examiner

*Primary Examiner* — Andrae S Allison
(74) *Attorney, Agent, or Firm* — Nutter McClennen & Fish LLP; John J. Penny, V.

(57) ABSTRACT

An image processing device specifies the number of pixels m for securing a delay time for preventing an error diffusion process from being performed at pixels of the (N+1)-th line in which diffusion of errors from a pixel of N-th line (N is a natural number) of image data is not completed, performs a control of starting an error diffusion process of the (N+1)-th line of the image data after the error diffusion process of the m-th pixel for the N-th line of the image data, and performs the error diffusion process for each line of the image data.

9 Claims, 3 Drawing Sheets

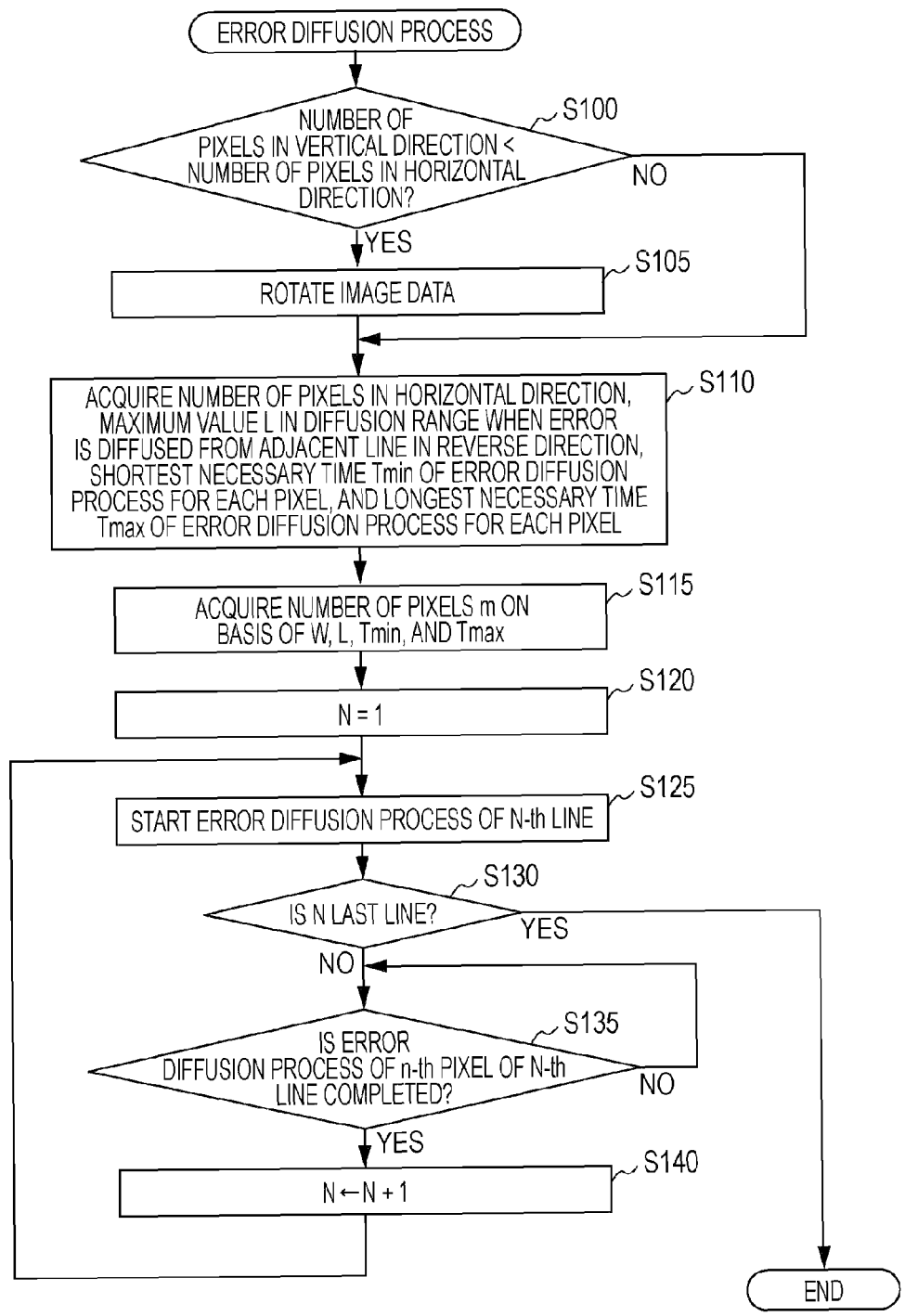

IMAGE PROCESSING DEVICE, IMAGE PROCESSING METHOD, AND IMAGE PROCESSING PROGRAM

BACKGROUND

1. Technical Field

The present invention relates to an image processing device performing an error diffusion process.

2. Related Art

The error diffusion process is used to express multi-gradation image data in less gradations, for example, when a gradation value of a pixel is binarized, the error diffusion process is realized in a manner in which a process of diffusing an error of the gradation value occurring when performing the binarization to peripheral pixels of a target pixel is performed on the pixels of the image data. When the error diffusion process is performed for each line of the image data, the process of diffusing the error is performed in order from a pixel of one end of a certain line to the a pixel of the other end as the target pixels, and the process is performed from the first line to the last line.

In this case, the error of the target pixel of the N-th line is diffused to pixels present in the (N+1)-th line. Accordingly, the diffusion of the error of the N-th line with respect to a pixel in the (N+1)-th line is completed, after which this pixel is set as the target pixel until there is no longer a possibility that the error will be diffused to this pixel, whereby there is a limitation in that it is difficult to perform the error diffusion process of the (N+1)-th line. In the related art, a technique for performing the error diffusion process at a high speed under such a limitation has been developed, for example, in JP-A-2000-125122, a technique is described in which a parallel process of performing an error diffusion process of adjacent lines by a first CPU and a second CPU is performed, and the error diffusion process is performed in parallel while sequentially checking a positional relationship of the target pixel for each pixel such that the error diffusion process of the (N+1)-th line does not pass the error diffusion process of the N-th line.

In JP-A-2000-125122, the positional relationship of the target pixel is sequentially checked for each pixel such that the error diffusion process of the (N+1)-th line does not pass the error diffusion process of the N-th line. Accordingly, it is necessary to perform the checking whenever the target pixel is changed for all the pixels present in each line. For this reason, the time necessary for the checking is too long to be ignored, and the effect of the high speed according to the technique of the related art is attenuated as the number of pixels is increased. In a processor of performing a great number of parallel processes, a configuration of performing an operation such that a process determined in advance on the basis of an input value provided when starting the process is performed to obtain an output value is employed, and it is difficult to provide a new input value by interrupting the process in the course of the operation. Accordingly, in the configuration of performing the error diffusion process for each line while checking the progress for each line whenever the target pixel is changed using a plurality of such processes, even when complete parallelization is attempted, it is difficult to control the progress degree of one processer on the basis of the input value representing the progress of the other processor, and in practice, it is difficult to perform complete parallelization.

SUMMARY

An advantage of some aspects of the invention is to provide a technique capable of performing an error diffusion process at a high speed using a processor in which it is difficult to provide a new input value by interrupting a process in the course of an operation.

According to an aspect of the invention, the number of pixels m for securing a delay time for preventing an error diffusion process from being performed at pixels of the (N+1)-th line, in which diffusion of an error from pixels of the N-th line (N is a natural number) of the image data is not completed, is specified. After the error diffusion process of the m-th pixel is completed for the N-th line of the image data, the error diffusion process of the (N+1)-th line of the image data is started. That is, the error diffusion process is started at the timing delayed from the N-th line by a predetermined number of pixels m on the (N+1)-th line such that the error diffusion of the (N+1)-th line is not started for pixels in which the diffusion of the error from the pixels of the N-th line is not completed.

With such a configuration, the start timing of the error diffusion process is only delayed by the number of common pixels m for each line, and thus it is possible to have a configuration in which that the error diffusion process in the target pixel is not started before the diffusion of the error from the other pixel with respect to an arbitrary pixel is completed. Accordingly, it is possible to complete the error diffusion process in each line without checking whether or not the error diffusion process in the (N+1)-th line has passed the error diffusion process in the N-th line whenever the target pixel is changed for all the pixels present in each line. Therefore, it is possible to perform the error diffusion process at a high speed as compared with the configuration of checking whether or not the error diffusion process in the (N+1)-th line passes the error diffusion process in the N-th line whenever the target pixel is changed. After the error diffusion process of each line is started, it is possible to complete the error diffusion process in each line without checking the progress of the other line. Accordingly, it is possible to perform the error diffusion process at a high speed using a processor which cannot provide a new input value by interrupting the process in the course of operation.

Herein, the delay pixel number specifying unit may specify m capable of securing the delay time for preventing the error diffusion process from being performed at the pixels of the (N+1)-th line in which the diffusion of the error from the pixels of the N-th line is not completed, by deviation of the start timing of the error diffusion process by the number of common pixels m in the previous line. Accordingly, the number of pixels m may be a common value for each line in the image data, may be determined according to the image data, and may be a predetermined fixed value. The delay time may be a time corresponding to a difference between the start timing of the N-th line and the start timing of the (N+1)-th line, and the delay time may be secured by preceding the error diffusion process of the N-th line by the m pixels.

The error diffusion processing unit may delay the start timing of the error diffusion process of the (N+1)-th line by m pixels as compared with the N-th line. That is, a common delay is provided for each line, the error diffusion process is started, and the error diffusion process may proceed without interrupting the process depending on the progress of the other line after starting the error diffusion process. Various types of processes may be employed as the error diffusion process, and various configurations may be employed for the number or disposition of pixels around the target pixel from which the error is diffused. The number or disposition of pixels around the target pixel may be modified according to the image data.

As a preferable configuration example to perform the high speed using parallelization, in a configuration in which the error diffusion processing unit is provided with a plurality of processors, the error diffusion process of the N-th line and the error diffusion process of the (N+1)-th line may be performed by different processors. With such a configuration, the error diffusion processes of the adjacent lines may be performed by different processors, and the error diffusion process of each line proceeds without depending on the progress of the error diffusion process in the other adjacent line. Accordingly, it is possible to perform the error diffusion process at a very high speed. Herein, a plurality of processors may be provided, and when the three or more processors are provided, the error diffusion process for each of the N-th, (N+1)-th, and (N+2)-th lines may be performed by different processors.

To specify the number of pixels m, the speed of the error diffusion process in each line may be used. For example, even when the error diffusion process of the N-th line is performed at the lowest speed and the error diffusion process of the (N+1)-th line is performed at the highest speed, the configuration may specify m such that the error diffusion process is not started at the pixels of the (N+1)-th line in which the diffusion of the error from the pixels of the N-th line is not completed. That is, when the error diffusion process of the N-th line is performed at the lowest speed and the error diffusion process of the (N+1)-th line is performed at the highest speed, the difference between the progress of the error diffusion process of the (N+1)-th line and the progress of the error diffusion process of the N-th line is decreased at the fastest time. Accordingly, in this case, when the number of pixels m in which the error diffusion process is not overtaken is specified, it is possible to reliably prevent the error diffusion process of the (N+1)-th line from overtaking the error diffusion process of the N-th line.

A condition in which the error diffusion process of the (N+1)-th line does not overtake the error diffusion process of the N-th line is a condition that "the error diffusion process is not started for the pixels of the (N+1)-th line present in the diffusion range of the error when the pixel in which the error diffusion process of the N-th line is not completed is the target pixel". Therein, it is preferable to specify the number of pixels m with reference to the error diffusion range. For example, the configuration may specific m from a relationship of $(W-m) \times Tmax = (W-L-1) \times Tmin$ on the basis of the number of pixels W of one line of the image data, a maximum value L of b in a case where a pixel of coordinates (i, N) (i is a natural number) of the N-th line is a target pixel and an error diffusion range of the (N+1)-th line is a range of coordinates (i−b, N+1) to coordinates (i+a, N+1) (a and b are natural numbers), the shortest necessary time Tmin of the error diffusion process of each pixel, and the longest necessary time Tmax of the error diffusion process of each pixel. With such a configuration, it is possible to specify the number of pixels m such that the error diffusion process is not started for the pixels of the (N+1)-th line present in the diffusion range of the error when the pixel in which the error diffusion process of the N-th line is not completed is the target pixel. When the diffusion range of the error is changed, b is changed, and the maximum value of b in the changed range is L. When the diffusion range of the error is not changed, b is equal to the maximum value L.

As shown in the formula, the number of pixels m for securing the delay time for preventing the error diffusion process from being performed at the pixels of the (N+1)-th line, in which the diffusion of the error from the pixels of the N-th line of the image data is not completed may depend on the number of pixels constituting one line. Therein, in the rectangular image data, the short sides of the rectangle and the line may be defined to be parallel, and the direction parallel to the short sides of the rectangle may be a proceeding direction of the error diffusion process. That is, the configuration is such that the error diffusion process proceeds not in the long side direction but in the short side direction, the number of pixels m corresponding to the delay time between the lines is decreased to be as small as possible, and the process is performed at the high speed as compared with the case where the error diffusion process proceeds in the long side direction.

With such a configuration, when the proceeding direction of the error diffusion process is fixed in a regular direction (for example, an x-axis direction when the image data is defined in a 2-dimensional orthogonal space formed of x and y axes), the image data is rotated such that the short side is parallel to the x axis. When the rotation of the image data is prohibited, the proceeding direction of the error diffusion process is changed.

The number of pixels m may be configured to become smaller as the number of pixels constituting the line becomes smaller. That is, as the number of pixels constituting the line becomes smaller, the delay time for preventing the error diffusion process from being performed at the pixels of the (N+1)-th line in which the diffusion of the error from the pixels of the N-th line is not completed becomes shorter. Therein, the number of pixels m may be set to become smaller for securing the delay time as the number of pixels constituting the line becomes smaller. The change of the number of pixels m corresponding to the number of pixels constituting the line may be linear, non-linear, and stepwise, and various configuration may be employed.

Various sequences may be employed as sequences of the error diffusion process, and a configuration causing the process to proceed in a manner different from the manner of causing the process to proceed in the direction of the arrangement of the lines may be employed for each line. For example, the block configured in two or more lines is a process unit, the error diffusion process is performed in order of arrangement of the pixels in the process unit, each process unit is sequentially set as a process target in order of the arrangement of the process units, and the error diffusion process may be performed for all the image data. In this case, the number of pixels m for securing a delay time for preventing an error diffusion process from being performed at pixels which are present in the process unit that is a process target at the (N+1)-th time for the pixels in which diffusion of errors from pixels present in a process unit that is an N-th (N is a natural number) process target is not completed is specified. The error diffusion process of the process unit that is the process target at the (N+1)-th time is started after the error diffusion process of the m-th pixel is completed for the process unit that is the process target at the N-th time.

With such a configuration, the start timing of the error diffusion process is only delayed by the number of common pixels m for each process unit, and thus it is possible to have a configuration in which the error diffusion process in the target pixel is not started before the diffusion of the error from the other pixel with respect to an arbitrary target pixel is completed. Accordingly, it is possible to complete the error diffusion process in the process unit without checking whether or not the error diffusion process in each process unit that is the process target at the (N+1)-th time passes the error diffusion process in the process unit that is the process target at the N-th time whenever the target pixel is changed for all the pixels present in each process unit. For this reason, it is possible to perform the error diffusion process at a high speed as compared with the configuration of checking whether or not the error diffusion process in the process unit that is the process target at the (N+1)-th time passes the error diffusion process in the process unit that is the process target at the N-th time whenever the target pixel is changed. After the error diffusion process of each process unit is started, it is possible to complete the error diffusion process in each process unit without checking the progress of the other process unit. Accordingly, it is possible to perform the error diffusion process at a high speed using a processor which cannot provide a new input value by interrupting the process in the course of operation. Herein, it is preferable to perform the error diffusion process for the pixels in another process unit by a different processor.

In the aspect of the invention, the method of delaying the start timing of the error diffusion process between the lines by the number of common pixels m in each line may be applied to a program or a method. The device, program, and method described above may be realized as a single device, may be realized using common components for a device having a complex function, and may include various aspects.

BRIEF DESCRIPTION OF THE DRAWINGS

The invention will be described with reference to the accompanying drawings, wherein like numbers reference like elements.

FIG. 3 is a flowchart illustrating an error diffusion process.

DESCRIPTION OF EXEMPLARY EMBODIMENTS

Figure 1:
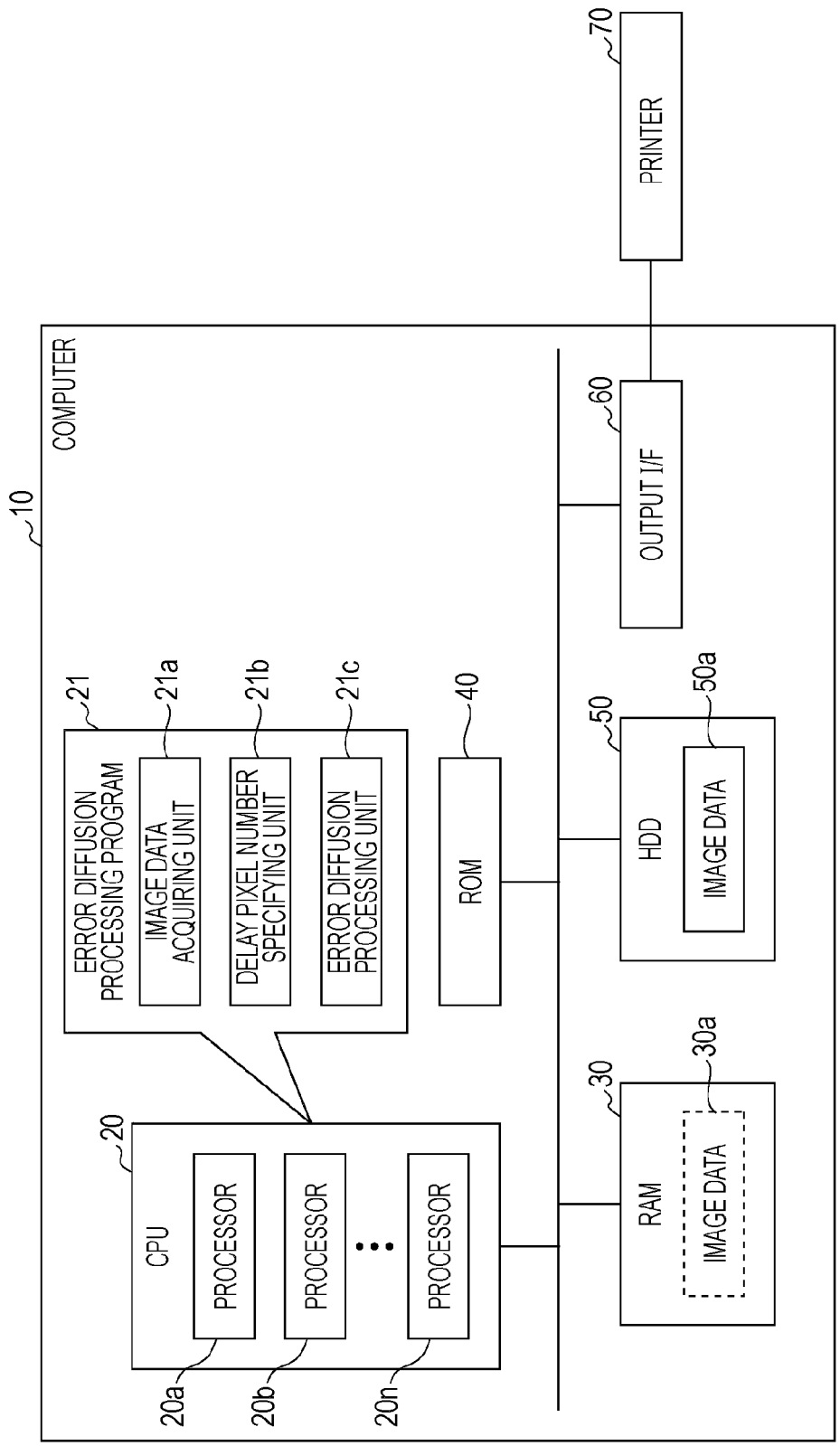
FIG. 1 is a block diagram illustrating an image processing device according to an embodiment of the invention.

Hereinafter, embodiments of the invention will be described in the following order.
1-1. Configuration of Image Processing Device
1-2. Error Diffusion Process
2. Other Embodiments 1-1. Configuration of Image Processing Device FIG. 1 is a block diagram illustrating an embodiment causing a computer 10 to function as an image processing device of the invention. A computer 10 includes a CPU 20, a RAM 30, a ROM 40, an HDD 50, and an output I/F 60. In the embodiment, the CPU 20 includes a plurality of processors 20a, 20b, . . . , 20n, and the CPU 20 can allow the processors 20a, 20b, . . . , 20n to perform a predetermined unit of operation such as an image process in parallel while performing a main control of a process performed in the computer 10. The processors 20a, 20b, . . . , 20n in the embodiment are configured to perform the operation process to obtain an output value without interruption according to a predetermined program on the basis of the input value provided when the process is started, and a new input value other than a value calculated in the course of the operation process cannot be provided in the course of the operation process.

The CPU 20 can perform a program recorded in the ROM 40 or the HDD 50 while appropriately using the processors 20a, 20b, . . . , 20n. In the embodiment, a printing control program configured by a plurality of program modules can be performed as one such program, and the printing control program includes an error diffusion processing program 21 performing an error diffusion process.

The computer 10 is connected to a printer 70 through the output I/F 60, and a user causes the CPU 20 to perform the printing control program, thereby causing the printer 70 to print a user-desired printing target. In the embodiment, the image data 50a is recorded in the HDD 50, and the printer 70 can print an image on the basis of the image data 50a as a printing target.

The printing control program is a program of performing a predetermined image process on the image data and generating printing data to cause the CPU 20 to perform a function of outputting the printing data to the printer 70. In the embodiment, the CPU 20 records the image data 50a of the printing target recorded in the HDD 50, as the image data 30a in the RAM 30 by an application program (not shown), and performs the image process or the like instructed by the user in which the image data 30a is the process target. The CPU 20 receives the printing instruction from the user and performs the printing process in which the image data 30a is the target by the printing control program. That is, the CPU 20 acquires the image data 30a from the RAM 30, performs various image processes, then transmits the printing data to the printer 70, and performs printing.

Specifically, the CPU 20 performs an image adjustment process such as an interpolation process of adjusting the number of pixels to perform printing in a resolution instructed by the user and an image process (a sharpness emphasizing process or a contrast adjustment process) for improving the image quality of the printing result, on the basis of the image data 30a, using a cache of the CPU 20, as necessary. The CPU 20 performs a color conversion process of converting a color system from an RGB color system or a YCC color system to an ink color system (for example, a CMYK color system) in which a color of ink is a color component, on the image data subjected to the image adjustment process.

The CPU 20 performs an error diffusion process of converting the number of gradations of the image data after the color conversion process into the number of gradations according to gradation expressive power of the printer 70 by the error diffusion processing program 21 included in the printing program. In the embodiment, image data of 256 gradations are converted into image data of 2 gradations. The number of gradations in the image data after the conversion depends on the gradation expressive power of the printer 70, the printer 70 in the embodiment can form a state of non-emitting ink and a state of emitting ink for each pixel, and thus the number of gradations after the error diffusion process is two gradations.

By using the print control program, the CPU 20 generates printing data capable of specifying the amount of output ink for each pixel on the basis of the image data after the error diffusion process, and outputs the printing data to the printer 70. In the printer 70, when the printing data is acquired, the ink is emitted in the output amount represented by the printing data, and an image is printed on a printing medium by driving a carriage, a paper transport roller, and piezoelectric elements of nozzles so as to record the ink on each pixel.

1-2. Error Diffusion Process

In the embodiment, in the printing control process described above, the error diffusion processing program 21 is configured to perform the error diffusion process at high speed, and hereinafter, the process based on the error diffusion processing program 21 will be described in detail.

Figure 2A:
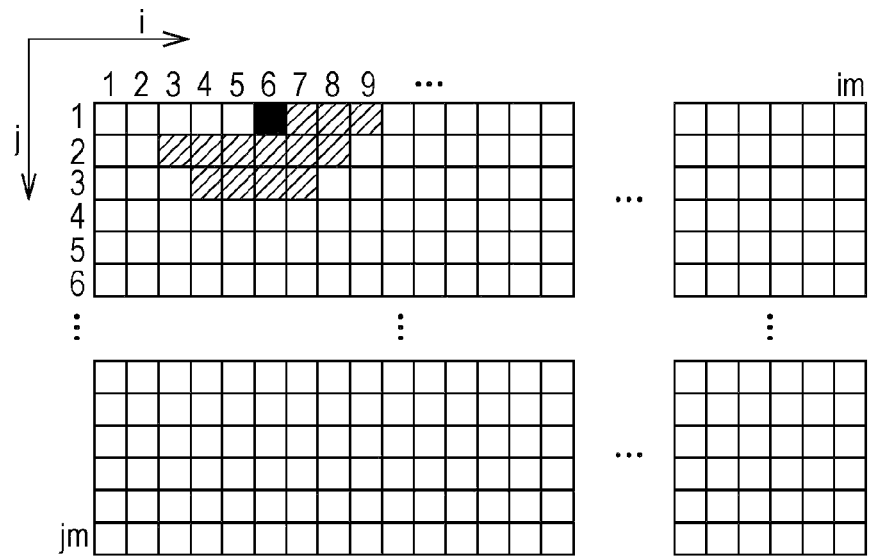
FIG. 2A to FIG. 2C are diagrams illustrating an example of image data.

FIG. 2A is a schematic diagram illustrating the image data that is the error diffusion target. In the embodiment, the image data that is the error diffusion target is the image data represented by the ink color system, and is data represented by 256 gradations of the number of gradations of each pixel for each color. In FIG. 2A, the pixels in the image data of any color are represented by squares. As shown in FIG. 2A, the image data that is the error diffusion target forms an orthogonal lattice in which im pixels are arranged in the horizontal direction (i-axis direction) and jm pixels are arranged in the vertical direction (j-axis direction), and is data in which the gradation values are associated with the pixels designated by the coordinates (i, j). In the embodiment, in such image data, it is considered that the pixels with the same coordinate value in the j-axis direction are in the same line.

The error diffusion process is a process of comparing the gradation value (sum of the gradation value indicated by the image data and the diffused error) that is a comparison target for the target pixel with a threshold value to make the gradation value after the error diffusion process 0 when the gradation value is smaller than the threshold value and to make the gradation value after the error diffusion process 1 when the gradation value is larger than the threshold value. The difference (error) between the gradation value after the error diffusion process and the gradation value that is the comparison target is diffused to the peripheral pixels of the target pixel to prevent accumulation of the error caused by the decrease in the number of gradations.

Herein, the range of diffusing the error may be appropriately adjusted, for example, it may be assumed that the pixel of the coordinates (6, 1) indicated in black in FIG. 2A is the target pixel, and the pixels indicated by hatching in the periphery thereof are the peripheral pixels. In the embodiment, a method of changing the diffusion range of the error by the gradation value for each pixel of the image data that is the target of the error diffusion process is employed. That is, the range of diffusing the error is variable according to the image data.

In the embodiment, one line is the process unit, the pixels arranged in the horizontal direction are sequentially set to the target pixel in order of arrangement of the pixels, and the error diffusion process proceeds. That is, the pixels designated by the same line number when considering the j coordinate value as the line number are sequentially set to the target pixel in order from the pixel with the small i coordinate value, the i coordinate value is increased by "1" whenever the error diffusion process is completed for one pixel to set a new target pixel, and the sequence of performing the error diffusion process is repeated until the i coordinate value becomes the im.

In the embodiment, the parallel process of performing the error diffusion process for each line described above by different processors is performed, and thus it is possible to perform the error diffusion process at the high speed. That is, the error diffusion process included in one line is performed by one processor, and the error diffusion process of the N-th line and the error diffusion process of the (N+1)-th line are performed by different processors. Herein, N is a natural number.

However, in the error diffusion process described in the embodiment, the error calculated when the pixel of the N-th line is the target pixel is diffused to the pixels of the (N+1)-th line as well as the pixels of the same line, and thus the error diffusion process of the N-th line has to be performed prior to the error diffusion process of the (N+1)-th line by a predetermined number of pixels. For example, in the example shown in FIG. 2A, when the pixel of the coordinates (6, 1) indicated in black on the first line is the target pixel and the pixels indicated by hatching in the periphery thereof are the peripheral pixels, the error is diffused to the pixels of the coordinates (3, 2) to the coordinates (8, 2) on the second line. Accordingly, the diffusion of the error for the pixels with the coordinates of the i coordinate value larger than that of the coordinates (2, 2) is not completed before the error diffusion process in which the pixel of the coordinates (6, 1) is the target pixel is completed, and the gradation value that is the comparison target is not definite. Accordingly, before the error diffusion process in which the pixel of the coordinates (6, 1) is the target pixel is completed, it is difficult to perform the error diffusion process on the pixels with the i coordinate value larger than that of the coordinates (2, 2) on the second line.

Therein, the error diffusion process of each line is started at the timing when the passing of the error diffusion process (the error diffusion process is performed on the pixels in which the diffusion of the error is not completed) does not occur. That is, the number of pixels m for securing the delay time for preventing the error diffusion process from being performed at the pixels of the (N+1)-th line in which the diffusion of the error from the pixel of the N-th line of the image data is not completed is specified. After the error diffusion process of the m-th pixel is completed for the N-th line of the image data, the error diffusion process of the (N+1)-th line of the image data is started.

In the embodiment, the number of pixels m is set to a value common in the lines. That is, the processors $20a, 20b, \ldots, 20n$ in the embodiment perform the operation process according to a predetermined program on the basis of the input value provided when starting the process, to obtain the output value, and have a configuration in which it is difficult to provide a new input value other than the value, which is calculated in the course of the operation process, in the course of the operation process. Accordingly, when the error diffusion process is performed by a different processor for each line, it is difficult to adjust the progress situation of the error diffusion process such that the progress situation of the error diffusion process of any line depends on the progress situation of the error diffusion process of any other line.

In the embodiment, by having a configuration in which the error diffusion process of the (N+1)-th line is started in a state where the N-th line is ahead of the (N+1)-the line by the predetermined number of pixels m, even when the error diffusion process proceeds irrespective of the progress situation of the N-th line with respect to the (N+1)-th line, the configuration specifies the number of pixels m while the error diffusion process of the (N+1)-th line does not pass the error diffusion process of the N-th line. As a result, it is possible to perform the error diffusion process at the high speed as compared with the configuration of checking the progress situation of the error diffusion process of the N-th line, for example, the configuration of checking whether or not the error diffusion process in the (N+1)-th line passes the error diffusion process of the N-th line whenever the target pixel is changed.

In the embodiment, the number of pixels m is specified such that the error diffusion process is not started at the pixels of the (N+1)-th line in which the diffusion of the error from the pixel of the N-th line is not completed, even when the error diffusion process of the N-th line is performed at the lowest speed and the error diffusion process of the (N+1)-th line is performed at the highest speed. Herein, the speed of the error diffusion process for each pixel depends on the diffusion range of the error, and thus a case of performing the error diffusion process at the lowest speed for each pixel and a case of performing the error diffusion process at the highest speed for each pixel can be assumed. When the error diffusion process is performed on all the pixels of the N-th line at the lowest speed and the error diffusion process is performed on all the pixels of the (N+1)-th line at the highest speed, the difference between the progress of the error diffusion process of the (N+1)-th line and the progress of the error diffusion process of the N-th line is gradually decreased as early as possible. Even in this case, when the number of pixels m is specified so as not to pass the error diffusion process, it is possible to reliably prevent the error diffusion process of the (N+1)-th line from passing the error diffusion process of the N-th line.

In such an assumption, as the number of pixels constituting one line becomes larger, the probability that the error diffusion process of the (N+1)-th line will pass the error diffusion process of the N-th line becomes higher. Accordingly, as the number of pixels constituting one line becomes larger, m becomes larger and the delay time between the lines becomes longer. As a result, the waiting period when the operation is not performed on one or more of the processors $20a$, $20b$, ..., $20n$ becomes longer to the extent of the increase of the m. In the embodiment, when the number of pixels constituting one line may be decreased by rotating the image data, it is configured that the number of pixels m is decreased by rotating the image data of the process target, to suppress the total time necessary for the error diffusion process.

To perform the error diffusion process described above, the error diffusion processing program 21 according to the embodiment is provided with an image data acquiring unit $21a$, a delay pixel number specifying unit $21b$, and an error diffusion processing unit $21c$. The image data acquiring unit $21a$ is a module for causing the CPU 20 to perform a function of acquiring the image data that is the target of the error diffusion process. The delay pixel number specifying unit $21b$ is a module for causing the CPU 20 to perform a function of specifying the number of pixels m for securing the delay time for preventing the error diffusion process from being performed at the pixels of the (N+1)-th line in which the diffusion of the error from the pixel of the N-line of the image data is not completed. The error diffusion processing unit $21c$ is a module for causing the CPU 20 and the processors $20a$, $20b$, ..., $20n$ to perform a function of performing the error diffusion process for each line of the image data by performing the control of starting the error diffusion process of the (N+1)-th line of the image data after the error diffusion process of the m-th pixel is completed on the N-th line of the image data.

In the error diffusion process, the CPU 20 acquires the image data of the error diffusion process target recorded in the RAM 30 or the cache of the CPU 20 by the process of the image data acquiring unit $21a$, and transfers the image data to the delay pixel number specifying unit $21b$, the error diffusion processing unit $21c$, and the processor $20a$, $20b$, ..., $20n$. In the embodiment, as described above, the CPU 20 or the processors $20a$, $20b$, ..., $20n$ perform the error diffusion process according to the flowchart shown in FIG. 3 in the state where the image data is appropriately transferred to the operation subject in the CPU 20 by the process of the image data acquiring unit $21a$.

In the embodiment, before starting the error diffusion process for each line, the number of pixels m is determined on the basis of the number of pixels of the image data that is the target of the error diffusion process, and the direction of the image data is adjusted such that the error diffusion process is performed at the higher speed as possible in which the number of pixels m is the smaller value as possible. That is, in the error diffusion process shown in FIG. 3, first, the CPU 20 acquires the number of pixels in the vertical direction (j-axis direction shown in FIG. 2A) of the error diffusion process target and the number of pixels in the horizontal direction (i-axis direction shown in FIG. 2A) from the process of the error diffusion process $21c$, and determines whether or not the number of pixels in the vertical direction is smaller than the number of pixels in the horizontal direction (Step S100).

In Step S100, when it is determined that the number of pixels in the vertical direction is smaller than the number of pixels in the horizontal direction, the CPU 20 rotates the image data by 90° by the process of the error diffusion processing unit $21c$ (Step S105). In Step S100, when it is determined that the number of pixels in the vertical direction is not smaller than the number of pixels in the horizontal direction, Step S105 is skipped. For example, in the example shown in FIG. 2A, in a case of jm<im, the image data is rotated by 90°, and in a case of jm≥im, the image data is not rotated by 90°.

Then, the CPU 20 acquires the number of pixels W in the horizontal direction, the maximum value L in the diffusion range when the error is diffused from the adjacent line in the reverse direction, the shortest necessary time Tmin of the error diffusion process for each pixel, and the longest necessary time Tmax of the error diffusion process for each pixel, by the process of the delay pixel number specifying unit $21b$ (Step S110). The number of pixels W in the horizontal direction is the number of pixels constituting one line in the i-axis direction. In the example shown in FIG. 2A, when the image data is not rotated, W=im, and when the image data is rotated, W=jm.

The maximum value L in the diffusion range when the error is diffused from the adjacent line in the reverse direction is a value predetermined by an algorithm of the error diffusion process. That is, in the embodiment, the diffusion range in which the error is diffused by the error diffusion process is variable, and it is possible to specify the diffusion range in advance. In the error diffusion process of the embodiment, a diffusion range when the error is diffused from the adjacent line in the reverse direction of the proceeding direction of the error diffusion process is extracted from the diffusion range which can be employed, the maximum value thereof is specified to be the maximum value L as described above.

For example, in FIG. 2A, the diffusion range of the error when the coordinates (6, 1) are the target pixel is represented by the hatched peripheral pixels, but the disposition of the peripheral pixels is an example. That is, in the embodiment, the diffusion range of the error is dynamically changed according to the gradation value of the target pixel. As described above, although the diffusion range of the error is dynamically changed, the disposition pattern of the peripheral pixels is selected from the predetermined disposition pattern. Accordingly, it is possible to specify the disposition pattern with the widest diffusion range from the disposition patterns of the peripheral pixels. Specifically, it is preferable that the maximum value of b be specified as the maximum value L when the obtained range in which the error is diffused from the pixel of coordinates (6, 1) of the first line shown in FIG. 2A to the pixels of the second line is represented by coordinates (6−b, 1) to coordinates (6+a, N+1) (a and b are natural numbers).

The shortest necessary time Tmin of the error diffusion process for each pixel and the longest necessary time Tmax of the error diffusion process for each pixel may be specified in advance by actual measurement or the like. That is, the process speed for each pixel of the error diffusion process is changed depending on the diffusion range of the error or the configuration of the processors $20a$, $20b$, ..., $20n$. Therein, the condition in which the error diffusion process is performed at the highest speed and the condition in which the error diffusion process is performed at the lowest speed are set and when the necessary time of the error diffusion process is measured in each condition, it is possible to specify the shortest necessary time Tmin of the error diffusion process for each pixel and the longest necessary time Tmax of the error diffusion process for each pixel. As described above, in Step S110, the number of pixels in the horizontal direction depending on the size of the image data of the process target, the predetermined maximum value L, the shortest necessary time Tmin, and the longest necessary time Tmax are acquired.

Figure 2B:
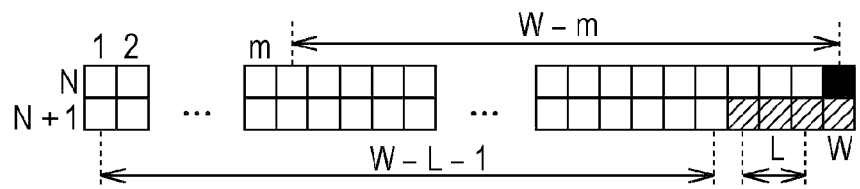

Then, the CPU 20 acquires the number of pixels m on the basis of the number of pixels W in the horizontal direction, the maximum value L, the shortest necessary time Tmin, and the longest necessary time Tmax, by the process of the delay pixel number specifying unit 21b (Step S115). That is, the CPU 20 specifies the number of pixels m to satisfy the relationship of (W−m)×Tmax=(W−L−1)×Tmin. FIG. 2B shows the image data of the N-th line and the (N+1)-th line provided with the total number of W pixels in the horizontal direction. In the example, the error diffusion process of the (N+1)-th line is started after the process of the m-th pixel of the N-th line is completed, and thus the number of pixels on which the error diffusion process has to be performed in the N-th line after the starting is (W−m). Therein, when the (W−m) is multiplied by the maximum necessary time Tmax of the error diffusion process for each pixel, it is possible to obtain the necessary time when the longest time is necessary until the error diffusion process is completed at the last pixel of the N-th line, after the error diffusion process of the m-th pixel of the N-th line is completed.

Meanwhile, in the (N+1)-th line, while the error diffusion process of the last pixel (W-th pixel) of the N-th line is completed, it is possible to perform the error diffusion process up to the pixel around the maximum range of the diffusion range when the error is diffused from the last pixel of the N-th line in the reverse direction. In this case, the number of pixels is (W−L−1). Therein, when the (W−L−1) is multiplied by the shortest necessary time Tmin of the error diffusion process for each pixel, it is possible to obtain the necessary time when the process is performed at the shortest time until the error diffusion process in the pixels around the maximum range of the diffusion range of the error from the last pixel of the N-th line is completed, after the error diffusion process of the (N+1)-th line is started. Therein, in the case where the necessary time is coupled in the equation such that the necessary times become equal and the number of pixels m is specified by solving the equation, even when the error diffusion process of the N-th line is performed at the lowest speed and the error diffusion process of the (N+1)-th line is performed at the highest speed, it is possible to specify m such that the error diffusion process of the (N+1)-th line is not started for the pixels of the (N+1)-th line in which the diffusion of the error based on the error diffusion process of the N-th line is not completed.

Then, the CPU 20 causes the processors 20a, 20b, ..., 20n to perform the error diffusion process for each line by the process of the error diffusion processing unit 21c. For this reason, the CPU 20 sets the variable N representing the line number corresponding to the position of the line along the j-axis direction to 1 (Step S120). Then, the CPU 20 selects the processor which does not perform the operation process from the processors 20a, 20b, ..., 20n, and starts the error diffusion process of the N-th line (Step S125). A flag representing that the error diffusion process of the m-th pixel for the N-th line is completed is turned on when the error diffusion process of the m-th pixel is completed on each line except for the last line.

Then, the CPU 20 determines whether or not N is the number corresponding to the last line by the process of the error diffusion processing unit 21c (Step S130). For example, in the example shown in FIG. 2A, when the image data is not rotated, it is determined whether or not N=jm. When the image data is rotated, it is determined whether or not N=im. In Step S130, when it is determined that N is the number corresponding to the last line, the process performed by the CPU 20 is completed. In this case, each process performs the error diffusion process in which the process is started in Step S125 to the last pixel, and the process is completed.

Meanwhile, in Step S130, when it is not determined that N is the number corresponding to the last line, the CPU 20 stands by until the error diffusion process of the m-th pixel of the N-th line is completed by the process of the error diffusion processing unit 21c (Step S135). That is, the CPU 20 monitors the flag representing that the error diffusion process of the m-th pixel for the N-th line is completed as described above, and waits until the flag is turned on.

In Step S135, when it is determined that the error diffusion process of the m-th pixel of the N-th line is completed, the CPU 20 increases the variable N representing the line number (Step S140), and the process of Step S125 and the subsequent processes are repeated. As a result, the error diffusion process for each line is performed in parallel by the processors 20a, 20b, ..., 20n while providing the delay of the delay amount corresponding to the number of pixels m between the adjacent lines.

2. Other Embodiment

The embodiment described above is an example for embodying the invention, the start timing of the error diffusion process between the lines by the number of common pixels m for each line may be delayed, and other various embodiments may be employed. For example, the number of gradations in the image data after the error diffusion process is not limited to two gradations, and may be three or more. That is, the number of gradations in the image data after the error diffusion process may correspond to the gradation expressive power of the printer. For example, when the size of ink droplets can be adjusted in three stages, the number of gradations of one pixel that may be expressed by the printer is four. Accordingly, the number of gradations of the image data after the error diffusion process may be four.

The image processing device performing the error diffusion process is not limited to the configuration realized by the computer, and may be realized by the CPU or the like built in the printer. The configuration of the processors for parallelization is not limited to the embodiment described above, the CPU and the plurality of processors may be separately configured, and the plurality of processors may be dispersed and disposed in a plurality of devices.

In addition to the configuration in which the plurality of processors described in the embodiment are under the control of the CPU, various configurations may be employed, and a configuration may be used in which one of a plurality of processors with the same configuration may perform the control of all the processes and the other processors may perform the error diffusion process. The roles played by the CPU and the processors may be appropriately changed. For example, as a part of the error diffusion process of the (N+1)-th line, the processor performing the error diffusion process of the (N+1)-th line may monitor the flag representing that the error diffusion process of the m-th pixel of the N-th line is completed, and various configurations may be employed. That is, the configuration of performing the error diffusion process up to the last pixel without depending on the progress of the other line after the error diffusion process of first pixel is performed on the line by the processor may be employed, and various configurations may be employed.

In the embodiment described above, the image data is rotated such that the number of pixels in the horizontal direction is smaller than the number of pixels in the vertical direction before performing the error diffusion process. However, when the reducible time by rotating the image data is short and time is necessary for the rotation of the image data, Steps S100 and S105 described above may be removed.

Figure 2C:
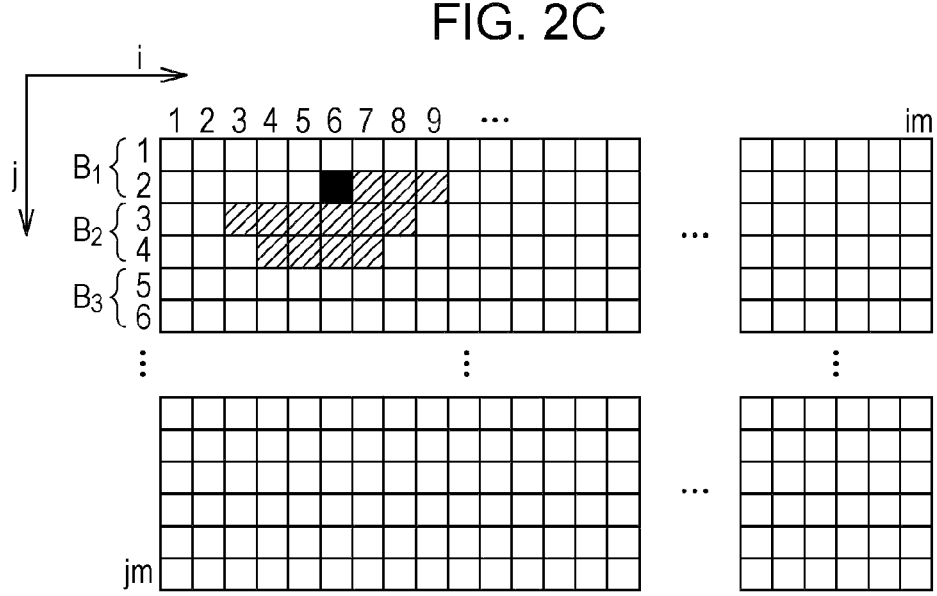

The error diffusion process may be performed in order of arrangement of the pixels, and a configuration other than the configuration of performing the error diffusion process for each line may be employed. For example, the invention may be applied to a configuration in which two or more adjacent lines are the process unit, the process target is set in order of arrangement of the process units, and the error diffusion process is performed in order of arrangement of pixels for each process unit. FIG. 2C is a diagram illustrating an example in which two adjacent lines are the process unit for the image data shown in FIG. 2A.

That is, in the example shown in FIG. 2C, the first line and the second line constitute one process unit $B_1$, the third line and the fourth line constitute one process unit $B_2$, and the fifth line and the sixth line constitute one process unit $B_3$. Hereinafter, two lines are considered as one process unit. Since the process target is set in order of arrangement of the process units B1, B2, and B3, the process units B1, B2, and B3 become the process target in the order described above. In order to sequentially set all the pixels to the target pixel by performing the error diffusion process in order of the arrangement of pixels in such process units, for example, the target pixel is changed in the vertical direction from the upper side to the lower side while there are unprocessed pixels in the vertical direction in the process unit, and the pixel present at the top position in the vertical direction in the process unit among the adjacent pixels when there is no unprocessed pixels in the vertical direction may be set as the target pixel. In a case of the process unit $B_1$ of the example shown in FIG. 2C, the target pixel is set in order of coordinates (1, 1), coordinates (1, 2), coordinates (2, 1), coordinates (2, 2), . . . , coordinates (im, 1), and coordinates (im, 2).

In the configuration described above, the number of pixels m is specified to secure the delay time for preventing the error diffusion from being performed at the pixel in which the diffusion of the error from the pixel present in the process unit $B_N$ that is the process target at the N-th time (N is a natural number) is incomplete and at the pixel present in the process unit $B_{N+1}$ that is the process target at the (N+1)-th time. That is, the number of pixels m is specified to satisfy the relationship of (W−m)×Tmax=(W−L−1)×Tmin on the basis of the pixel number W in the processing unit, the maximum value L of the diffusion range, the shortest necessary time Tmin of the error diffusion process for each pixel, and the longest necessary time Tmax of the error diffusion process for each pixel when the error is diffused from the process unit that is the process target at the N-th time to the process unit that is the process target at the (N+1)-th time and when the error is diffused in the reverse direction to the proceeding direction of the horizontal direction of the error diffusion process. In FIG. 2C, when the maximum range of the diffusion range of the error from the pixel of the coordinates (6, 2) is the range indicated by hatching in FIG. 2C, the proceeding direction of the horizontal direction of the error diffusion process is the i-axis direction, and thus the maximum value L of the diffusion range when the error is diffused in the reverse direction to the proceeding direction of the horizontal direction of the error diffusion process is 3.

It is preferable to start the error diffusion process of the process unit that is the process target at the (N+1)-th time, after the error diffusion process of the m-th pixel is completed for the process unit that is the process target at the N-th time. For example, in the example shown in FIG. 2C, when the number of pixels m is 12, the error diffusion process of the process unit $B_2$ is started after the error diffusion process of the coordinates (6, 2) of the twelfth pixel in the process unit $B_1$ is completed. In the error diffusion process described above, it is preferable that the pixels in each process unit be configured to perform the error diffusion process by other processors. According to the configuration described above, it is possible to perform the error diffusion process at the high speed.

What is claimed is:

1. An image processing device comprising:
a processor configured to execute
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data upon completion of the error diffusion process of the m-th pixel of the N-th line of the image data such that the error diffusion process of the N-th line and the error diffusion process of the (N+1)th line are performed in parallel;
wherein the delay pixel number specifying unit specifies m from a relationship of (W−m)×Tmax=(W−L−1)×Tmin on the basis of the number of pixels W of one line of the image data, a maximum value L of b in a case where a pixel of coordinates (i, N) of the N-th line is a target pixel and an error diffusion range of the (N+1)-th line is a range of coordinates (i−b, N+1) to coordinates (i+a, N+1), the shortest necessary time Tmin of the error diffusion process of each pixel, and the longest necessary time Tmax of the error diffusion process of each pixel, i being a natural number, and a and b being natural numbers.

2. An image processing device comprising:
a processor configured to execute
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data upon completion of the error diffusion process of the m-th pixel of the N-th line of the image data such that the error diffusion process of the N-th line and the error diffusion process of the (N+1)th line are performed in parallel;
wherein the image data acquiring unit acquires the rectangular image data, and
wherein the error diffusion processing unit defines short sides of the rectangle and the line to be parallel, and the direction parallel to the short sides of the rectangle is a proceeding direction of the error diffusion process.

3. An image processing device comprising:
a processor configured to execute
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data upon completion of the error diffusion process of the m-th pixel of the N-th line of the image data such that the error diffusion process of the N-th line and the error diffusion process of the (N+1)th line are performed in parallel;
wherein the delay pixel number specifying unit sets m to become smaller as the number of pixels constituting the line becomes smaller.

4. An image processing device comprising:
a processor configured to execute
an image data acquiring unit that acquires image data;
a delay pixel number specifying unit that specifies the number of pixels for securing a delay time for preventing an error diffusion process from being performed at pixels which are present in a process unit that is a process target at the (N+1)-th time for the pixels in which diffusion of errors is incomplete from pixels present in a process unit that is an N-th process target, when process units configured of two or more adjacent lines of the image data are set to a process target in order of arrangement of the process units and the error diffusion process is performed in order of arrangement of pixels for each process unit, N being a natural number; and
an error diffusion processing unit that starts the error diffusion process of the process unit that is the process target at the (N+1)-th time after the error diffusion process of the m-th pixel is completed for the process unit that is the process target at the N-th time.

5. An image processing device comprising:
a processor that executes
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data, after the error diffusion process of the m-th pixel of the N-th line of the image data is completed,
wherein the delay pixel number specifying unit specifies m from a relationship of $(W-m) \times Tmax = (W-L-1) \times Tmin$ on the basis of the number of pixels W of one line of the image data, a maximum value L of b in a case where a pixel of coordinates (i, N) of the N-th line is a target pixel and an error diffusion range of the (N+1)-th line is a range of coordinates (i−b, N+1) to coordinates (i+a, N+1), the shortest necessary time Tmin of the error diffusion process of each pixel, and the longest necessary time Tmax of the error diffusion process of each pixel, i being a natural number, and a and b being natural numbers.

6. The image processing device according to claim 5, wherein the delay pixel number specifying unit specifies m such that the error diffusion process is not started at the pixels of the (N+1)-th line in which the diffusion of the error from the pixels of the N-th line is not completed, even in a case where the error diffusion process of the N-th line is performed at the lowest speed and the error diffusion process of the (N+1)-th line is performed at the highest speed.

7. An image processing device comprising:
a processor that executes
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data, after the error diffusion process of the m-th pixel of the N-th line of the image data is completed,
wherein the image data acquiring unit acquires the rectangular image data, and
wherein the error diffusion processing unit defines short sides of the rectangle and the line to be parallel, and the direction parallel to the short sides of the rectangle is a proceeding direction of the error diffusion process.

8. The image processing device according to claim 7, wherein the processor includes a plurality of processors, and the error diffusion process of the N-th line and the error diffusion process of the (N+1)-th line are performed by different ones of the processors.

9. An image processing device comprising:
a processor that executes
an image data acquiring unit that acquires image data;
a delay pixel number specifying unit that specifies the number of pixels m for securing a delay time for preventing an error diffusion process from being performed at pixels of the (N+1)-th line in which diffusion of errors from pixels of the N-th line of the image data is not completed, N being a natural number; and
an error diffusion processing unit that controls starting of the error diffusion process of the (N+1)-th line of the image data to perform the error diffusion process for each line of the image data, after the error diffusion process of the m-th pixel of the N-th line of the image data is completed,
wherein the delay pixel number specifying unit sets m to become smaller as the number of pixels constituting the line becomes smaller.

* * * * *